June 29, 1948.   CARL-ERIK GRANQVIST   2,444,290
EARTH INDUCTION COMPASS
Filed Nov. 27, 1943
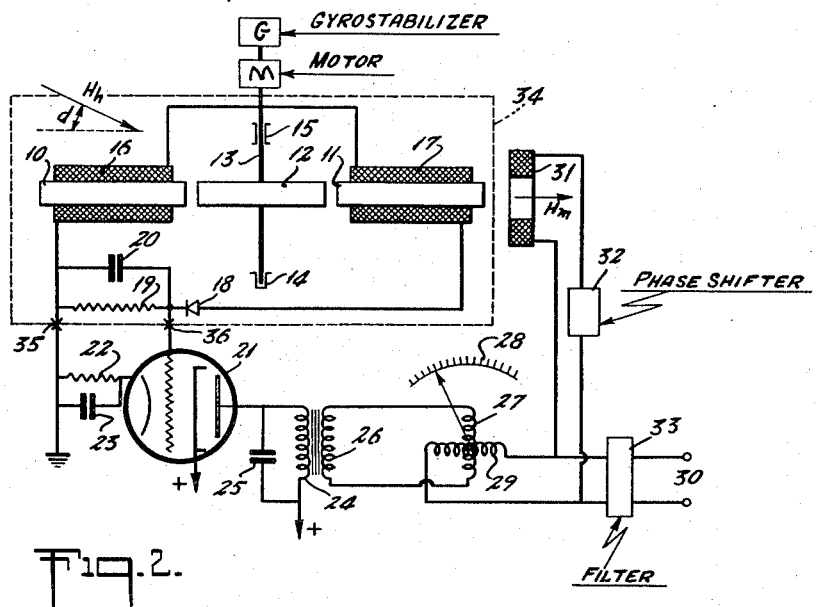
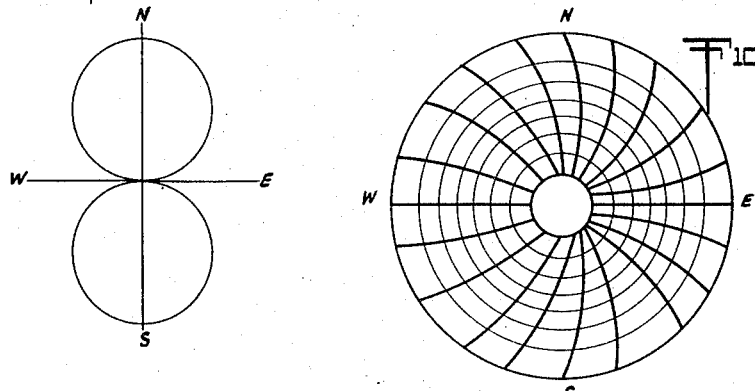
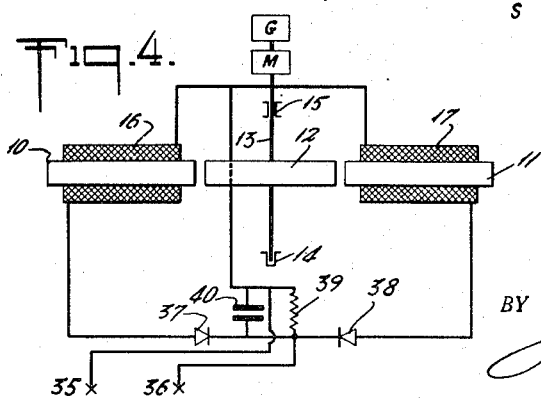
INVENTOR.
CARL-ERIK GRANQVIST.
BY
his ATTORNEY.

Patented June 29, 1948

2,444,290

UNITED STATES PATENT OFFICE 2,444,290

EARTH INDUCTION COMPASS

Carl-Erik Granqvist, Lidingo, Sweden, assignor to Svenska Aktiebolaget Gasaccumulator, Lidingo, near Stockholm, Sweden, a corporation of Sweden Application November 27, 1943, Serial No. 512,060
In Sweden February 2, 1943

3 Claims. (Cl. 33—204)

This invention relates to earth induction compasses and has for an object to provide a compass of the above type having novel and improved details of construction and operating characteristics.

The invention relates more particularly to earth induction compasses and similar navigation instruments of the type having magnetic cores of high permeability which are adjustable in azimuth. The cores comprise a pair of relatively fixed members and an intermediate rotatable member which is adapted to vary the reluctance of the magnetic circuit at a uniform rate. The magnetic circuit is polarized by an alternating field. The relatively fixed member is surrounded by output windings so arranged that voltages are induced therein having a component due to the alternating current excitation modulated by the alternating voltage due to the horizontal component of the earth's field.

A further object of the invention is to eliminate the effect of disturbing alternating current components which may be generated in the system and thereby improve the accuracy of the result.

In accordance with the present invention, this is accomplished by using an alternating current watt meter having coils one of which is connected to the source of alternating exciting current and the other of which is energized as a function of the induced potential derived from the output windings. This potential may be rectified and amplified before being applied to the watt meter. The arrangement is such that the watt meter is influenced only by currents of the predetermined frequency and the effect of all extraneous influences which tend to produce currents of other frequencies is eliminated.

The watt meter will give an indication which is a function of the angle between the longitudinal axis of the system of iron cores and the direction of the horizontal component of the earth magnetic field. It is possible to read this angle either directly on the watt meter or by turning the iron cores in the direction in which the watt meter gives a zero indication.

The invention is further described in connection with the annexed drawing, in which Fig. 1 is a schematic diagram illustrating a simple form of the invention, Fig. 2 is a diagram for explanation of the operation of the invention, Fig. 3 is a detail view of the dial of the watt meter, and Fig. 4 is a schematic diagram illustrating the invention.

In the arrangement according to Fig. 1, the magnetic circuit contains the two fixed magnetic cores 10 and 11 and a rotatable magnetic core 12 placed between them. The latter one is mounted on a shaft 13, which is journalled at 14 and 15. The cores 10 and 11 further are surrounded each by one winding 16 and 17, respectively, said two windings being connected in series. Their free terminals are connected to a rectifier 18, and a resistor 19 which is by-passed for alternating current of higher frequencies by means of a condenser 20.

The cathode of an amplifier tube 21 is connected to one terminal of the resistor 19 through a cathode bias resistor 22, its control grid being connected with the other terminal of resistor 19. The cathode bias resistor 22 is by-passed for alternating current by a condenser 23. The anode circuit of the tube 21 contains the primary winding 24 of a low frequency transformer, tuned to the modulation frequency by means of a condenser 25, the secondary winding 26 being combined with one coil 27 of a watt meter working on a dial 28. The other coil 29 of the instrument is connected with a line 30 carrying alternating current of a fixed frequency.

The line 30 is also connected to a coil 31 in series with a phase correction filter 32. The coil 31 is associated with the magnetic cores 10—11 in such a way that the field created by the coil causes an alternating polarizing action. The phase correcting filter 32 may contain an ohmic resistance.

The above described arrangement according to Fig. 1 acts in the following manner:

It is assumed, that the shaft 13 rotates at $\tfrac{1}{2}\omega_1$ revolutions per second, the line 30 having a frequency of $\omega_2$ periods a second. The horizontal component of the earth's magnetic field is represented by $H_h$, the angle of this field with the longitudinal axis of the magnet system 10—11 by $a$, and the amplitude of the intensity of the field created by the coil 31 by $H_m$. The rotor part 12 causes an alternating field $\phi$ to pass through the magnetic circuit, the magnitude of which is $$\phi = K_1[H_h \cos a + H_m \sin \omega_2 t] \cos \omega_1 t \quad (1)$$

in which formula $K_1$ represents a constant determined by the properties of the magnet system.

The expression of $\phi$ is developed into the form:

$$\phi = K_1 H_h \cos a \cos \omega_1 t + K_1 H_m \frac{1}{2} [\sin (\omega_1 + \omega_2)t - \sin (\omega_1 - \omega_2)t] \quad (2)$$

For determining the voltage generated in the winding 16—17 the expression of $\phi$ is differentiated:

$$\frac{d\phi}{dt} = -\omega_1 K_1 H_h \cos a \sin \omega_1 t + K_1 H_m \frac{1}{2}[(\omega_1+\omega_2) \cos (\omega_1+\omega_2)t - (\omega_1-\omega_2) \cos (\omega_1-\omega_2)t] \quad (3)$$

As will be shown below it is of substantial importance that $\omega_2$ be small in relation to $\omega_1$. Hence as a first approximation the factors $(\omega_1+\omega_2)$ and $(\omega_1-\omega_2)$ may be replaced with $\omega_1$. The Equation 3 then will take the following form:

$$\frac{d\phi}{dt} = \omega_1 K_1 [-H_h \cos a \sin \omega_1 t + \frac{1}{2} H_m [\cos (\omega_1+\omega_2)t - \cos (\omega_1-\omega_2)t]] \quad (4)$$

From this the voltage in the winding 16—17 is derived as:

$$e = K_2[H_h \cos a \sin \omega_1 t - \frac{1}{2} H_m [\cos (\omega_1+\omega_2)t - \cos (\omega_1-\omega_2)t]] \quad (5)$$

In Equation 5, $K_2$ is a constant determined by $K_1$, the constants of the windings, $\omega_1$ etc.

From Formula 5 it is evident that the carrier wave $\omega_1$ is modulated to produce two sidebands displaced by the frequency $\omega_2$ from the carrier wave.

It is the voltage $e$ that is rectified in the rectifier 18. To begin with it is assumed, that this rectification takes place in the usual manner by amplifying the voltage on a square characteristic, so that each of the square terms of the contained parts and also the double product of these two parts are obtained. The square alternating voltage terms in the rectifier output will be of a high frequency so that they give no voltage across the resistor 19, as the condenser 20 shortcircuits this resistor for alternating current of higher frequencies. On the other hand, the double product of the terms represents a rectified voltage:

$$2H_h \cos a \sin \omega_1 t \frac{1}{2} H_m [\cos (\omega_1+\omega_2)t - \cos (\omega_1-\omega_2)t] \quad (6)$$

After development the expression 6 will give:

$$H_h H_m \cos a \frac{1}{2}[\sin (2\omega_1+\omega_2)t - 2 \sin \omega_2 t - \sin (2\omega_1-\omega_2)t] \quad (7)$$

The first and the last part of expression 7 also represent high frequencies which will be by-passed by means of the condenser 23. Across the resistor 22 therefore a voltage will be developed:

$$E_L = K_3 H_h H_m \cos a \sin \omega_2 t \quad (8)$$

in which equation $K_3$ is a constant determined by $K_2$ and by the properties of the resistor 19 and the rectifier 18.

The voltage $E_L$ is fed to one winding of the watt meter the other winding of which is fed directly from the lines 30 with a voltage $E_m$. The filter 32 is assumed to be so dimensioned that both of the voltages are in phase. The torque in the watt meter then is obtained as:

$$M_v = K_4 E_L E_m = K_4 H_h H_m E_m \cos a \quad (9)$$

From Equation 9 it is evident that the reading of the watt meter will be directly dependent upon the geographical angle between the earth magnetism and the longitudinal axis of the cores 10—10. The dependence is expressed in the form of a cosine curve, which has the form in a polar diagram of a figure 8 as shown in Fig. 2. An investigation of the form of the curve shows, that maximum reading is obtained in the two directions N and S, whereas the reading should be zero in the two geographical directions E and W. In practice it is, of course, not always suitable to use the instrument as a direct-reading compass because there are a number of sources of errors. For example the flat form of the curve according to Fig. 2 adjacent to north and south makes the device insensitive in this position. Also the reading of the instrument is not dependent solely upon the above mentioned geographical angle, but also depends upon the field intensity of the horizontal component of the earth's magnetism provided that the instruments always are placed in horizontal position. The instrument may be held in a horizontal position by mounting a gyroscope G with the rotating system 12—13 so as to remove the last named source of error. On the other hand the source of error due to the horizontal component of the earth's magnetism varying in intensity from place to place on the earth cannot be thus eliminated. Hence it is necessary to know the field intensity of the horizontal component of the earth's magnetism at the place where the instrument is used, and the dial of the instrument must be arranged in such a way that the direction may be read at different values of field intensity. Such a dial may take the form of a diagram, as shown in Fig. 3, but it is evident that such a dial may be difficult to read by a person not skilled in more complicated instrument readings.

On the dial according to Fig. 3 the different concentric circles represent the different values of the horizontal component of the field intensity, and the bent radial curves indicate the geographical directions.

It should be mentioned that the line E-W in Fig. 3 indicates the zero-value of the instrument, as the reading in this direction should be zero, as is evident from Fig. 2. In the two directions E and W the radial curves, therefore, will be linear, and the above mentioned difficulty in reading is not present in these two directions. This characteristic may be utilized by arranging the magnet cores 10—11 manually or automatically together with a linear graded compass card on which the geographical direction may be read. When using the instrument in the last mentioned manner it is only necessary to place the longitudinal direction of the cores 10—11 so that the watt meter shows zero indication. The geographical direction is then determined as the angle which the cores 10—11 have been turned from their direction at zero indication which must always be the magnetical east-west direction.

An investigation shows that the sources of error when putting the cores in the east-west direction may be of two different kinds.

The first of these special sources of error is due to the fact that the rate of modulation of the modulated signal according to Equation 5 may be represented as $$X = \frac{H_m}{H_h \cos \alpha} \quad (10)$$

It is easily seen that as cos α approaches zero the rate of modulation X will approach an infinite value which causes insufficient rectification and strong distortion in the amplifier tube 21. In order to increase the maximum value of the rate of modulation the field intensity $H_m$ should be very small in relation to the field intensity $H_h$. A further improvement is achieved if the resistor 19 is connected between earth and the control grid of the tube 21 so that the direct current voltage drop across the resistor 19 will vary and thereby give the tube 21 a variable grid bias. The tube 21 should preferably be a so called variable mu tube, so that the variation of the amplification will counteract the said error.

The other one of the two special sources of error which occur in the E–W position results from the creation of a second harmonic. If the rectifier 18 is not functioning on the square law a second harmonic of the low frequency component of the rectified voltage will be produced. Now it is known that an ideal square rectifier cannot be obtained, but that all rectifiers have certain errors with respect to their characteristics. This is especially true in the case of a rectifier of the diode type or a contact rectifier which functions with a relatively small square term in their characteristics, the linear term being the greatest although certain terms of higher degree are also present. In practice therefore it is not possible to prevent a second harmonic of the measuring voltage from being fed to the watt meter by the simple arrangement of Fig. 1.

As a matter of fact this second harmonic should not necessarily be of any harm if it were not for the presence of the second harmonic of the voltage from the line 30. These two oscillations may cause an error in the reading of the watt meter in the E–W direction.

It is evident that harmonics of higher rate than the second could also provide a similar effect, but in practice it has proved that such higher harmonics usually have a comparatively small amplitude. Their influence, therefore is negligible.

The last mentioned disadvantage may be removed according to a further embodiment of the invention by connecting a filter 33 in the line circuit 30, Fig. 1, and by providing a double acting rectifier as shown in Fig. 4.

The arrangement according to Fig. 4 is meant to replace the part surrounded by the broken line 34 in Fig. 1, the connection points to other parts of Fig. 1 in this figure as well as in Fig. 4 being designed as 35 and 36, respectively. In other respects similar parts in Fig. 1 and Fig. 4 have been designated with similar reference characters.

In the arrangement according to Fig. 4 the oscillations from each of the windings 16 and 17, respectively, are rectified separately in rectifiers 37 and 38. The load resistor is designated 39 and the condenser for by-passing this load resistor at 40. It is known that such a symmetrical rectifier will produce no even harmonics.

The invention is, of course, not limited to the above embodiments, but certain modifications may be made without departing from the scope of the invention.

What I claim is:

1. In an induction compass, a magnetic path sensitive to the earth's magnetic field, comprising a pair of relatively stationary magnetic members and a rotatable magnetic member mounted to vary the reluctance of said path, means rotating the rotatable member at a uniform speed said relatively stationary members being mounted for orientation in the earth's field, windings on said last members connected to carry an induced voltage, a polarizing winding associated with said magnetic path, a source of alternating current connected to energize said last winding for producing an alternating polarizing field, whereby said induced voltage represents a voltage due to said alternating polarizing field modulated by the voltage due to the earth's field, a rectifier connected to rectify said induced voltage and an alternating current watt meter having a pair of windings connected respectively to said alternating current source and to the output of said rectifier.

2. An induction compass as set forth in claim 1 in which said polarizing winding is energized to produce an alternating polarizing field which is small as compared to the field in said magnetic path due to the earth's magnetic field.

3. In an induction compass as set forth in claim 1, phase shifting means connected between said alternating current source and said polarizing winding and having means to cause the field produced by said polarizing winding to be in phase with the voltage supplied to said watt meter by said rectifier.

CARL-ERIK GRANQVIST.

REFERENCES CITED

The following references are of record in the file of this patent:

UNITED STATES PATENTS

| Number | Name | Date |
|---|---|---|
| Re. 21,156 | Oakley | July 18, 1939 |
| 1,886,336 | Gunn | Nov. 1, 1932 |
| 2,025,897 | Reichel | Dec. 31, 1935 |
| 2,038,787 | Guerra | Apr. 28, 1936 |
| 2,049,232 | Sydnes | July 28, 1936 |
| 2,201,559 | Moseley | May 21, 1940 |
| 2,206,018 | Bechberger | July 2, 1940 |
| 2,240,680 | Stuart | May 6, 1941 |
| 2,334,469 | Alexandersson et al. | Nov. 16, 1943 |